United States Patent
Kinney et al.

(10) Patent No.: US 8,165,719 B2
(45) Date of Patent: Apr. 24, 2012

(54) SYSTEM AND METHOD FOR AN ELECTRICAL INSULATING SHUTTER SYSTEM

(76) Inventors: Laurence F. Kinney, Boulder, CO (US); Gerald L. Cler, Windsor, CO (US); Todd Eric Bergeson, Nederland, CO (US); Derek Christopher Lindberg, Littleton, CO (US)

( * ) Notice: Subject to any disclaimer, the term of this patent is extended or adjusted under 35 U.S.C. 154(b) by 540 days.

(21) Appl. No.: 12/491,607

(22) Filed: Jun. 25, 2009

(65) Prior Publication Data
US 2010/0332034 A1   Dec. 30, 2010

(51) Int. Cl.
*G05B 15/02* (2006.01)
*H05K 13/00* (2006.01)

(52) U.S. Cl. ........ 700/275; 700/299; 318/483; 318/468; 318/480; 318/266; 455/419

(58) Field of Classification Search .................. 700/275, 700/299; 250/338.1; 160/176.1 V; 318/264, 318/285, 468, 480, 483
See application file for complete search history.

(56) References Cited

U.S. PATENT DOCUMENTS

| | | | | |
|---|---|---|---|---|
| 3,675,023 A * | 7/1972 | Kunke et al. | ............... | 250/338.1 |
| 4,115,953 A | 9/1978 | Brosenius | | |
| 5,460,216 A | 10/1995 | Hirao et al. | | |
| 5,532,560 A * | 7/1996 | Element et al. | ............... | 318/266 |
| 5,907,227 A * | 5/1999 | Domel et al. | ................. | 318/480 |
| 5,990,646 A * | 11/1999 | Kovach et al. | ................ | 318/468 |
| 6,014,839 A * | 1/2000 | Ruggles | .......................... | 327/86 |
| 6,798,341 B1 | 9/2004 | Eckel et al. | | |
| 6,983,783 B2 * | 1/2006 | Carmen et al. | ................ | 160/120 |
| 7,138,926 B2 * | 11/2006 | Henry et al. | ............... | 340/693.5 |
| 7,342,375 B2 * | 3/2008 | Johansen | ...................... | 318/483 |
| 7,953,402 B2 * | 5/2011 | Carolan et al. | ................ | 455/419 |

OTHER PUBLICATIONS

Larry Kinney, Evaporative Cooling Policy and Program Options: Promising Peak Shaving in a Growing Southwest, published at http://www.swenergy.org/pubs/index.html in May 2004, pp. 10-11 are relevant to Specification paragraphs [0027]-[0035] and Figures 2 and 3.

* cited by examiner

*Primary Examiner* — Albert Decady
*Assistant Examiner* — Douglas Lee
(74) *Attorney, Agent, or Firm* — Yorgos Marinakis

(57) ABSTRACT

A system, and a method for manufacturing that system, for electrically and automatically opening, closing and otherwise controlling window shutters on a building, for the purposes of limiting radiant, conductive, and convective thermal losses from the inside of the building to the outside during the heating season, and limiting radiant, conductive, and convective thermal gains from the outside of the building to the inside during the cooling season. The system further comprises an interface to accommodate connection to other sensors not used to control the thermal environment of the building, such as motion detectors, burglar alarms, CO sensors and the like.

138 Claims, 11 Drawing Sheets

SYSTEM AND METHOD FOR AN ELECTRICAL INSULATING SHUTTER SYSTEM

CROSS-REFERENCE TO RELATED APPLICATIONS

Not applicable

STATEMENTS REGARDING FEDERALLY SPONSORED RESEARCH AND DEVELOPMENT

Not applicable.

BACKGROUND

The present invention satisfies the need of having a system, and a method for manufacturing that system, for electrically and automatically opening, closing and otherwise controlling window shutters on a building, for the purposes of limiting radiant, conductive, and convective thermal losses from the inside of the building to the outside during the heating season, and limiting radiant, conductive, and convective thermal gains from the outside of the building to the inside during the cooling season. The system further comprises an interface to accommodate connection to other sensors not used to control the thermal environment of the building, such as motion detectors, burglar alarms, CO sensors, fire/smoke sensors and the like indoors and fire and wind sensors outdoors.

Information relevant to attempts to address these problems can be found in U.S. Pat. Nos. 6,798,341; 6,014,839; 5,532,560; 5,460,216; and 4,115,953; which are not admitted to be prior art with respect to the present invention by its mention in this Background Section. It is desirable to have better apparatuses and/or methods than what is disclosed in the identified references.

U.S. Pat. No. 6,798,341 is a network based multi-function sensor and control device suitable for sensing motion, temperature, humidity and ambient light, setting and controlling temperature and control relay and ballast loads, and which includes blinder devices for reducing nuisance tripping of the device. The patent does not disclose or claim a device for opening and closing shutters. Rather it seeks to provide an open control system that both provides the sensors for and interoperably integrates different proprietary standard building systems such as lighting controls, HVAC systems, security systems, fire alarm systems and motor drives. An electrical insulating shutter is not integrable with the device disclosed in '341 because, among other things, the '341 device is limited to indoor use, whereas the present invention requires outdoor sensors; and the device disclosed in '341 does not accept remote sensor data and consists of a unitary sensor housing, whereas the present invention requires has only remote sensors in the sense that there is no unitary sensor housing. The device disclosed in '341 does not include a shutter or a plurality of shutters. Rather it is a plurality of sensors placed in a single housing, the sensors providing data (temperature, humidity, ambient light) for the forementioned building systems. The present invention is not directed towards a multi-function sensor, in a single housing or otherwise. Moreover, the software tasks of '341 are not directed towards energy efficiency, whereas those in the present invention are.

U.S. Pat. No. 6,014,839 is an adjustable framed shutter assembly having an electric motor attached to one of a plurality of slats whereby the plurality of slats may be rotated to open and close the shutter assembly. Patent '839 claims an electronic actuating system in combination with a shutter assembly for selectively rotating a selected slat of the shutter assembly, using a drive spindle. The present invention, in contrast, utilizes a direct current electric gear motor that rotates a jack screw fastened via a drive nut or nuts to the shutter. Patent '839 also claims an electronic actuating system in combination with a shutter assembly wherein the powering means includes a device selected from the group consisting of a timer, a remote control, a photosensitive switch, a mechanical switch, and combinations thereof (Claim 5). The present invention also utilizes a remote control to enable or disenable the auto mode of a shutter or group of shutters, and to open and shut them, but the present invention does not use a timer. The present invention uses a pyranometer to sense solar radiation, and unlike '839 it uses it in combination with a temperature sensor and a number of other parameters to enable a programmable controller such as a microprocessor to calculate gains and losses and make a decision about opening or closing to optimize energy performance, using inputs from a plurality of remote sensors. Patent '839 utilizes a programmable controller to coordinate two actuators, or to serve as a timed actuator, or to serve as a remote actuator, or to serve as a photosensitive actuator, or to automate and centrally control multiple fixtures and appliances as part of a "smart house" (Column 1 Line 48); however, "smart house" means a comfortable house, not an intentionally energy efficient house: "Automatic shutter assemblies would increase the comfort and convenience of the surroundings in a house, and may even conserve energy and reduce heating and cooling expenses by optimizing the amount of solar radiation entering the house" (Column 1 Lines 49-54). Moreover, '839 does not integrate and process input from a plurality of sensors. The present invention in summer optimizes the amount of solar radiation entering a building by keeping it low. In wintertime it lowers losses by means of insulating window areas, thus diminishing conductive, convective, and radiant losses U.S. Pat. No. 5,532,560 discloses an invention that senses light levels and adjusts blinds to let more or less light in. Patent '560 utilizes a photosensor with a dark threshold comparator, whereas the present invention utilizes a pyranometer to sense the entire solar spectrum in order to determine solar heat gain. Patent '560 is an entirely analog system. It utilizes no digital programmable processor. Patent '560 does not use temperature as part of the sensing system and control algorithm. The present invention utilizes net radiation and indoor and outdoor temperatures to compute optimal settings for saving energy, not for merely adjusting light levels or solar flux transmitted.

U.S. Pat. No. 5,460,216 is a device for moving a winding shaft in a shutter. The patent suggests using a shutter curtain having insulating properties.

U.S. Pat. No. 4,115,953 is an indoor insulating shutter system. It utilizes no sensors. It is not motor-driven or otherwise automatic.

SUMMARY

The embodiments of the present invention comprise a system with hardware, sensor, and software components to manipulate insulating panels (shutters) so as to:
A. Modulate the amount of solar light and heat transmitted to the inside of a building either directly or through a window;
B. Limit radiant, conductive, and convective thermal losses from the inside of a building to the outside of the building during the heating season;

C. Limit radiant, conductive, and convective thermal gains from the outside of the building to the inside of the building during the cooling season;
(The above two functions are aimed at enhancing the energy efficiency of a building and increasing the comfort of the occupants of a building. The system is completely automated to optimize energy performance summer and winter, while responding to user controls to over-ride when desired The present invention allows for inputs from outside data (such as NOAA) to make predictive control decisions. It also allows for locking out the system's decisions in cases of high winds, hurricanes, fire, and the like). Shutters may be completely open, completely shut, or set somewhere in between. Shutters may be opaque, translucent, or have portions of each.)

D. Provide protection from exterior fires by the sensing of their presence by electronic means (e.g., via a UV sensor with appropriate control algorithms to optimize sensitivity to flames in the immediate vicinity while minimizing false alarms from the sun and other non-threatening sources), warning of their existence via auditory and visual devices; communicating via wireless electronics to all shutters in the system causing them to close, and being equipped with fireproof facades able to resist intense flames for sufficiently long periods to allow building occupants to safely escape;

E. Provide protection from high-velocity winds through sensing of their presence by electronic means (pressure difference sensor with appropriate control algorithms to optimize sensitivity to potentially damaging gusts as well as sustained high velocity winds while minimizing false alarms), warning of their existence via auditory and visual devices; communicating via wireless electronics to all shutters in the system causing them to close, and being equipped with mechanical and material means able to resist intense winds and flying objects;

F. Provide protection from small arms fire by responding to user commands (via push buttons on one or more wireless infrared controls—or direct wired if desired) to close some, a group, or all shutters in the building, said shutters being equipped with mechanical and material means (e.g, Kevlar, carbon nanotubes, tungsten disulfide, while not being limited to these specific materials) to be able to resist the penetration of most small arms fire;

G. Provide protection from interior fire by responding automatically to a fire/smoke alarm or by a command from the user to open all shutters; and H. Provide for emergency egress by a mechanical means through which a handle can be pulled, thereby disconnecting a shutter from its driving mechanism allowing it to be moved with impunity, thereby facilitating emergency egress.

In the present invention, moveable insulating panels of various sizes are manipulated on one or more jack screws (or similar mechanical means) turned by one or more gear motors controlled to optimize energy efficiency or to meet other user-desired criteria of the moment; and to accept and respond to automatic signals, over-ride signals, panic signals, safety signals, or a combination.

The shutters can be situated inside the windows, outside of the windows, or in a pocket when not covering fenestration; this pocket shutter with one or two shutters (where (a) one goes left, the other right or (b) two go the same direction, with one sliding under the other) has applications to homes, greenhouses, commercial buildings, industrial buildings, pet doors, and more. The shutters may be stowed in walls, ceilings, slopes, above and below and to the sides of windows, both inside and outside; accordion fold models in special boxes above and below windows as well as to either side; in special slots on the outside of foundation walls. The shutters may be manipulated to slide up, down, or sideways. They may also swing open and shut. The number of movable insulating and shading elements ranges from one shutter to a plurality of shutters. The shutters can fold in numerous ways. Insulating and shading panels fold accordion-like (akin to large sliding partitions in hotels that function as temporary room dividers); only these can operate vertically or horizontally, covering (or partially covering if desired) a window when open. (For the vertical case, when closed, they stack together, for example, in a box at the bottom of a window or at the top of a window, or one each. Thus they are protected from inclement weather such as high winds, snow, ice, and rain when stowed.) For cases in which shutter sections are stowed at the bottom and top of a window system, when driven to cover all or a portion of the window, the accordion-folded bottom section of the shutter unfolds as it is moved into place where it may meet with the top section of the shutter similarly moved somewhere like half way up the window. This configuration gives the option of accomplishing tactical shading at the top, on the one hand, or privacy or the shielding of an offensive view on the bottom on the other hand.

The controller includes a dedicated controller, or an existing microprocessor, laptop, or other computer application where potentially complex shutter programming can be accomplished, then sent to shutters, (one, some subset, or all) to open, partially open, or close as programmed, with or without the auto mode that optimizes energy performance, with or without safety signals. This optimizing may include gathering of and using additional outside information to make smarter decisions.

FIGURES

These and other features, aspects and advantages of the embodiments of the apparatus and/or methods will become better understood with reference to the following description, appended claims, and accompanying drawings where:

Figure 3A:
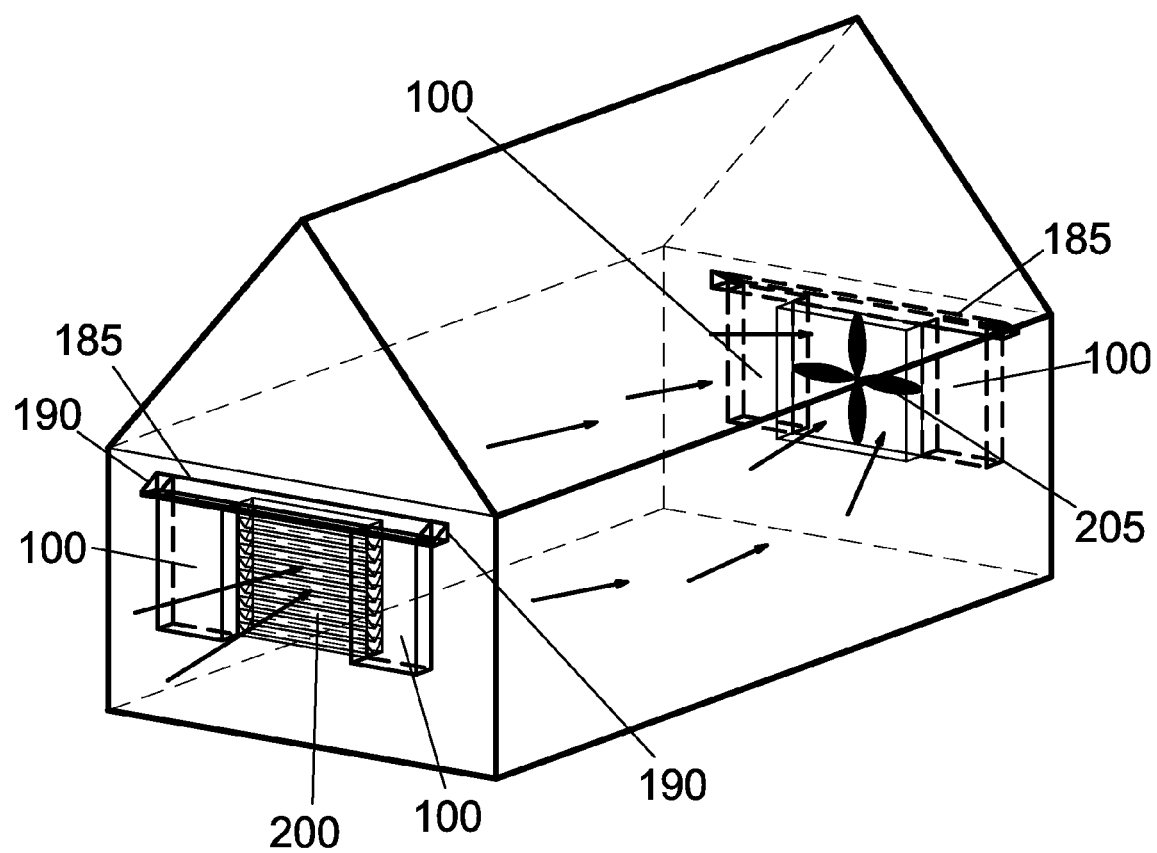
Figure 4:
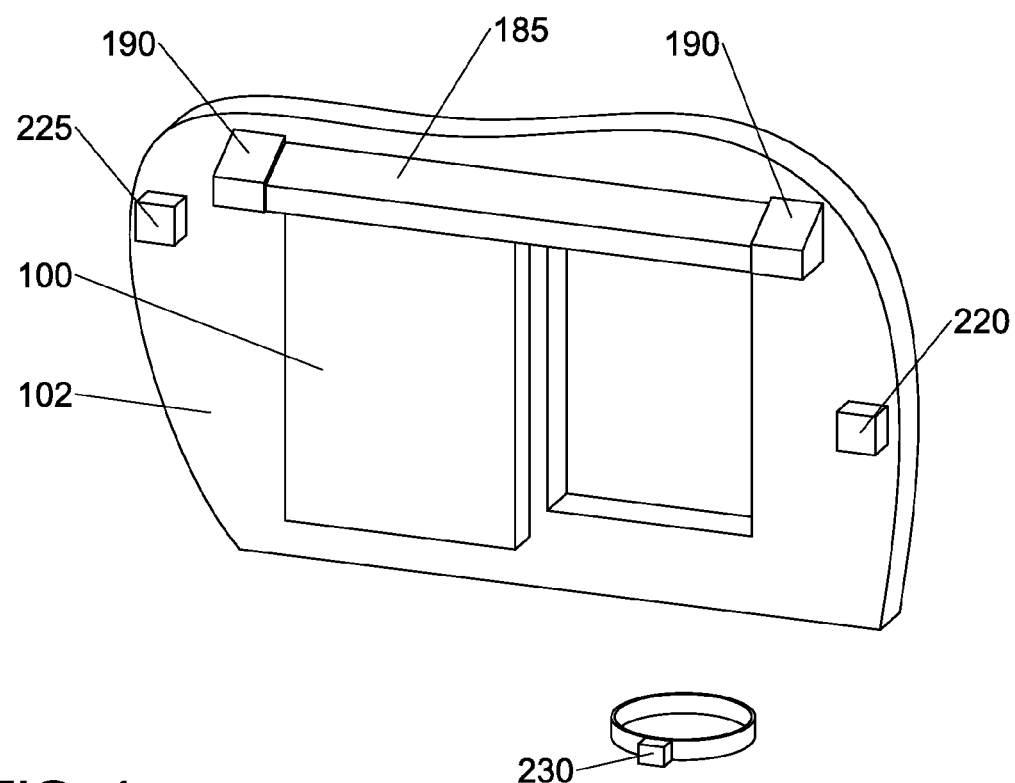
Figure 5A:
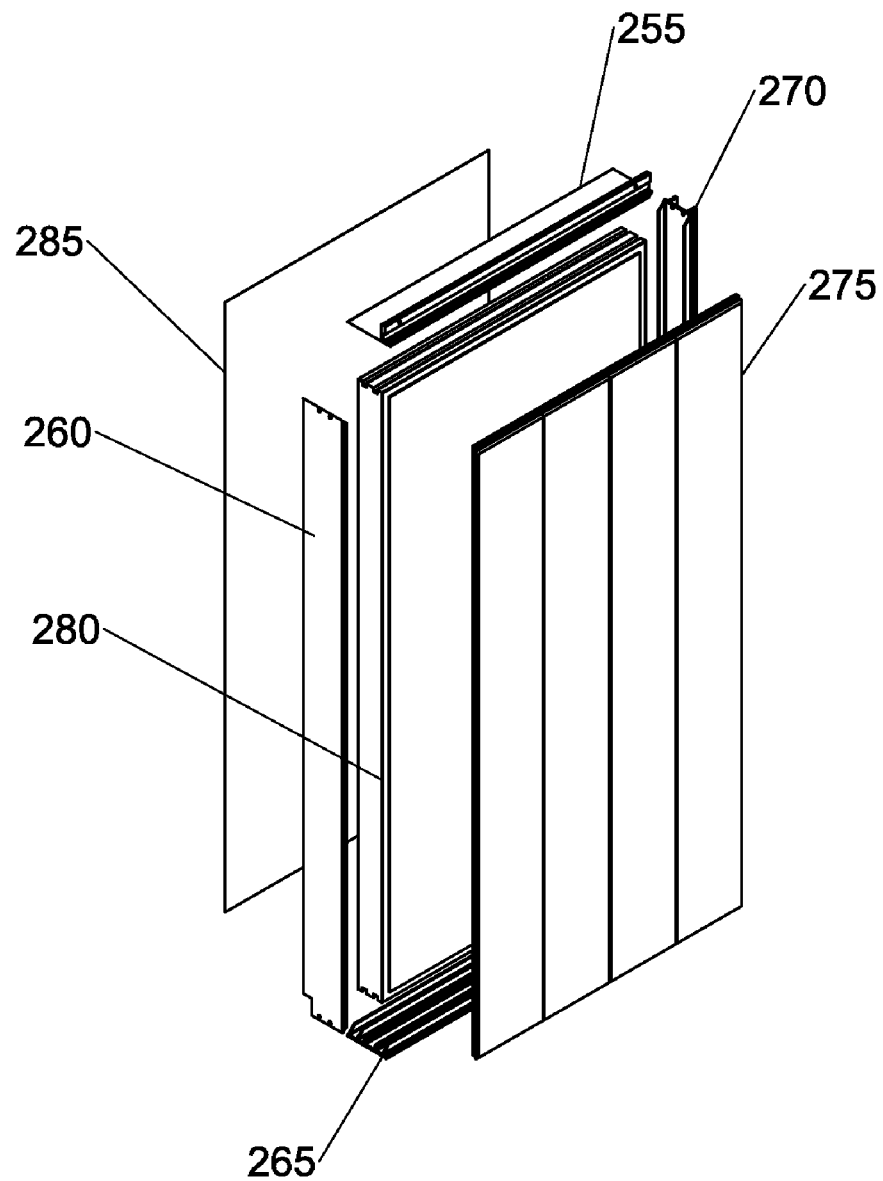
Figure 5B:
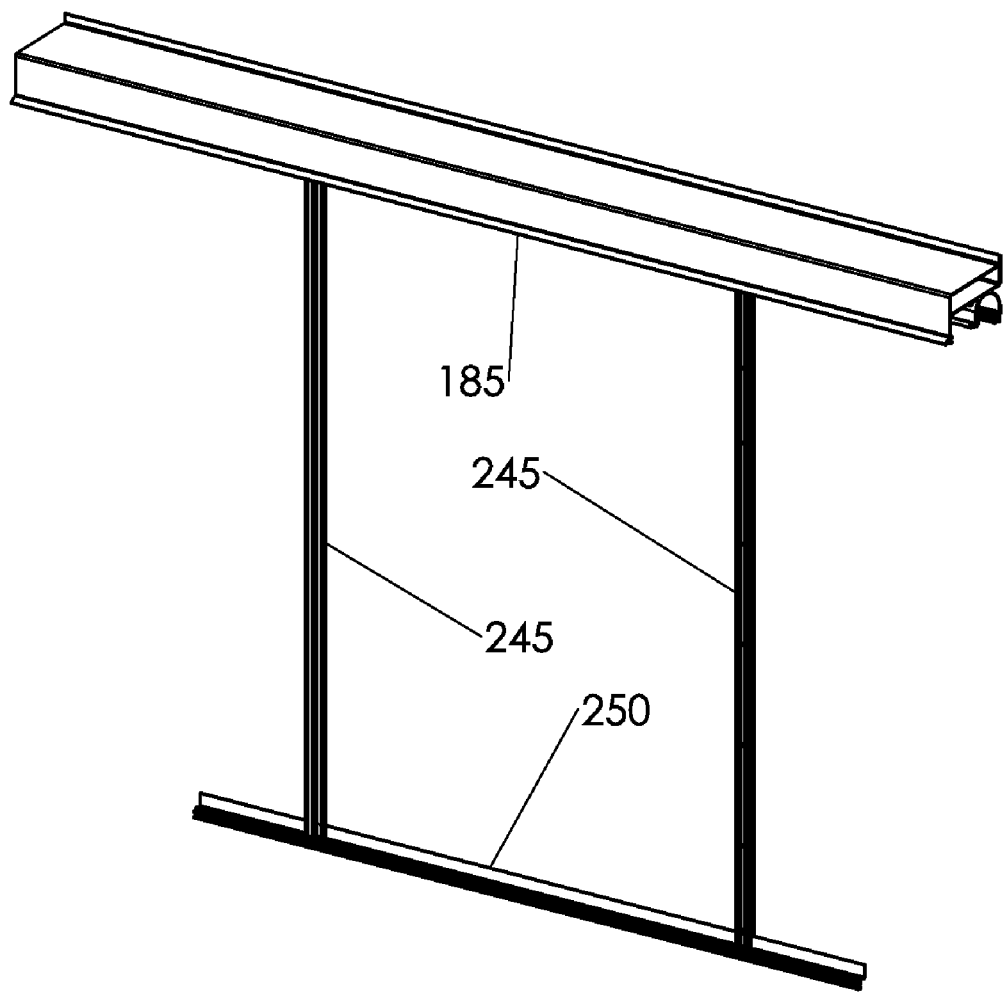
Figure 6:
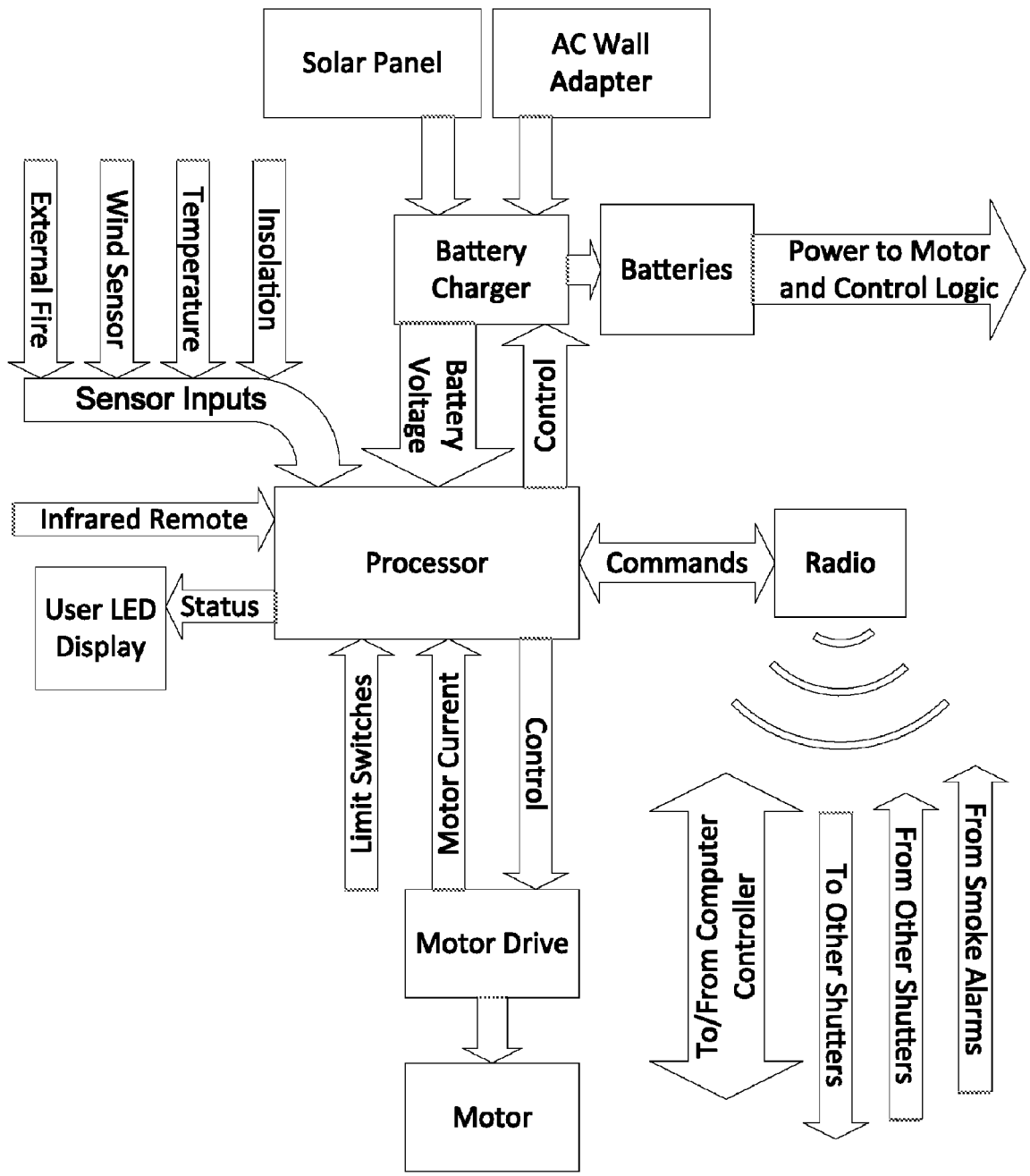
Figure 7:
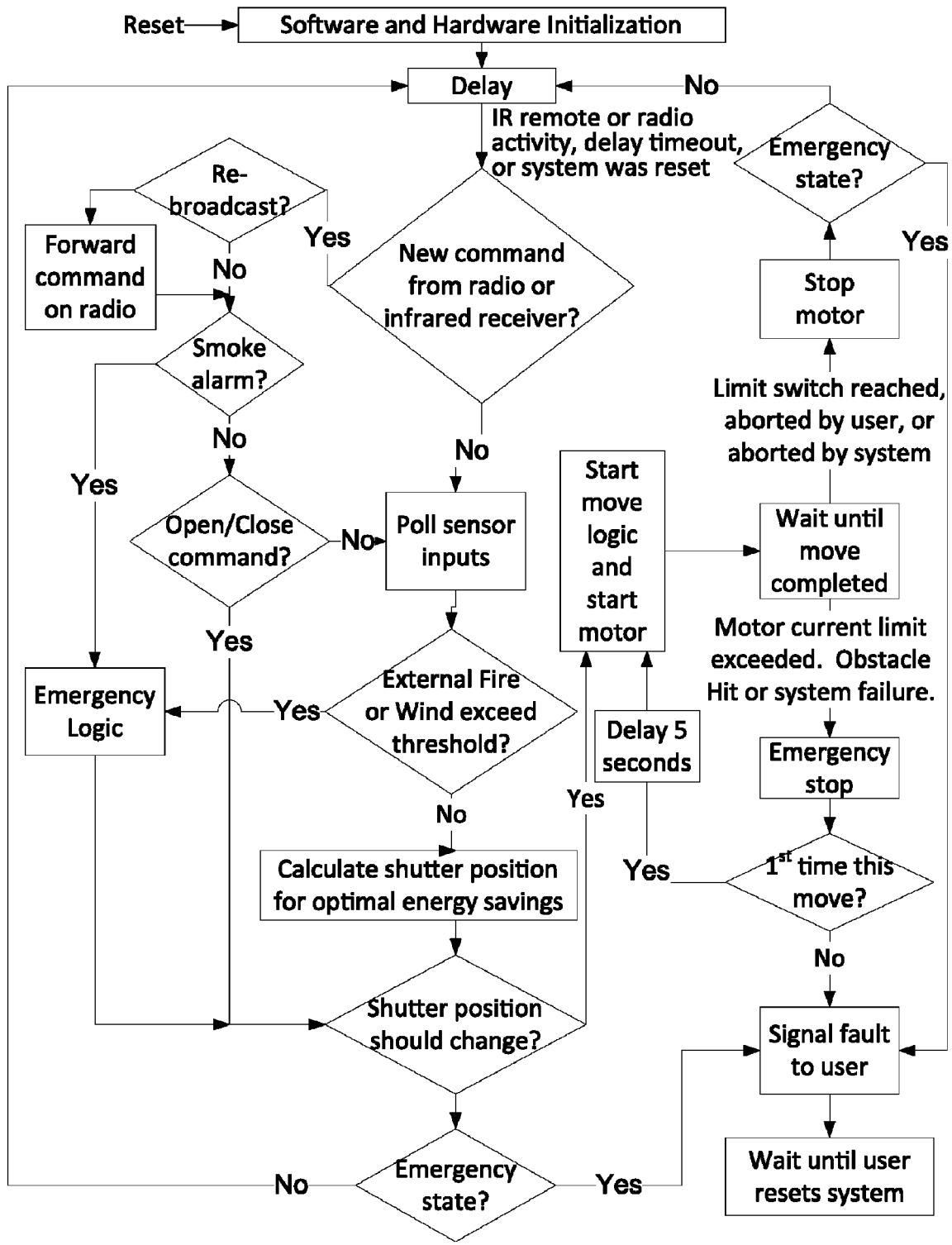
Figure 8:
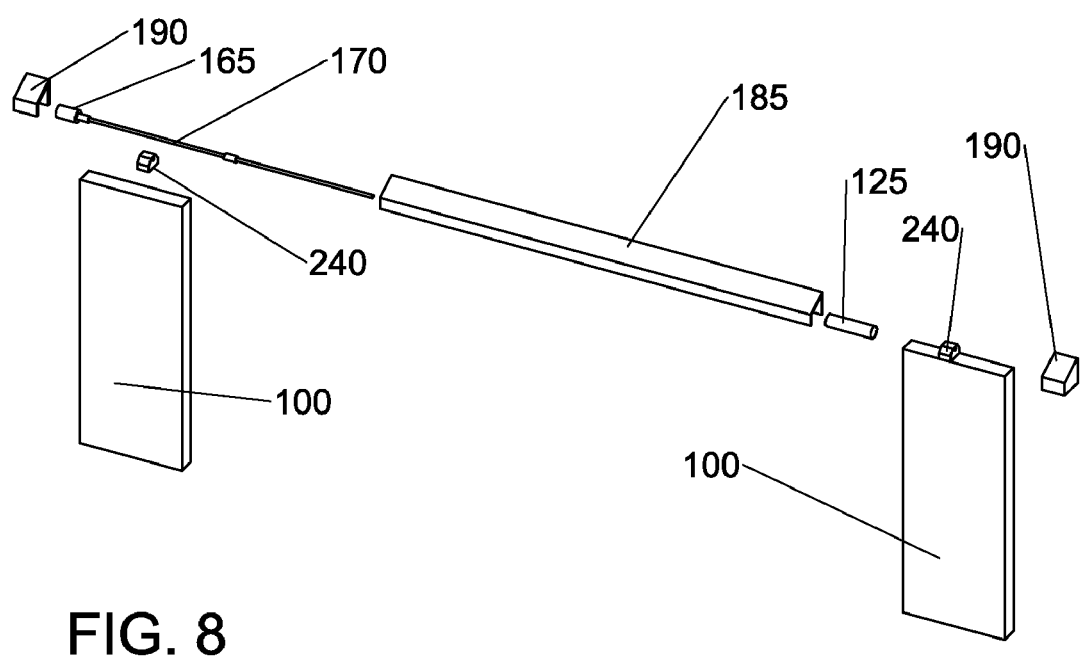

FIGS. 3A and B show an insulating shutter over an air inlet to an evaporative cooler when the fan is separated from the medium;

FIG. 4 shows an insulating shutter over a pet door;

FIGS. 5A and 5B show the preferred embodiment of the shutters;

FIG. 6 show a block diagram of the shutter electronics;

FIG. 7 shows a flowchart of the controller program;

FIG. 8 shows an exploded view of an embodiment of the invention; and

Figure 9:
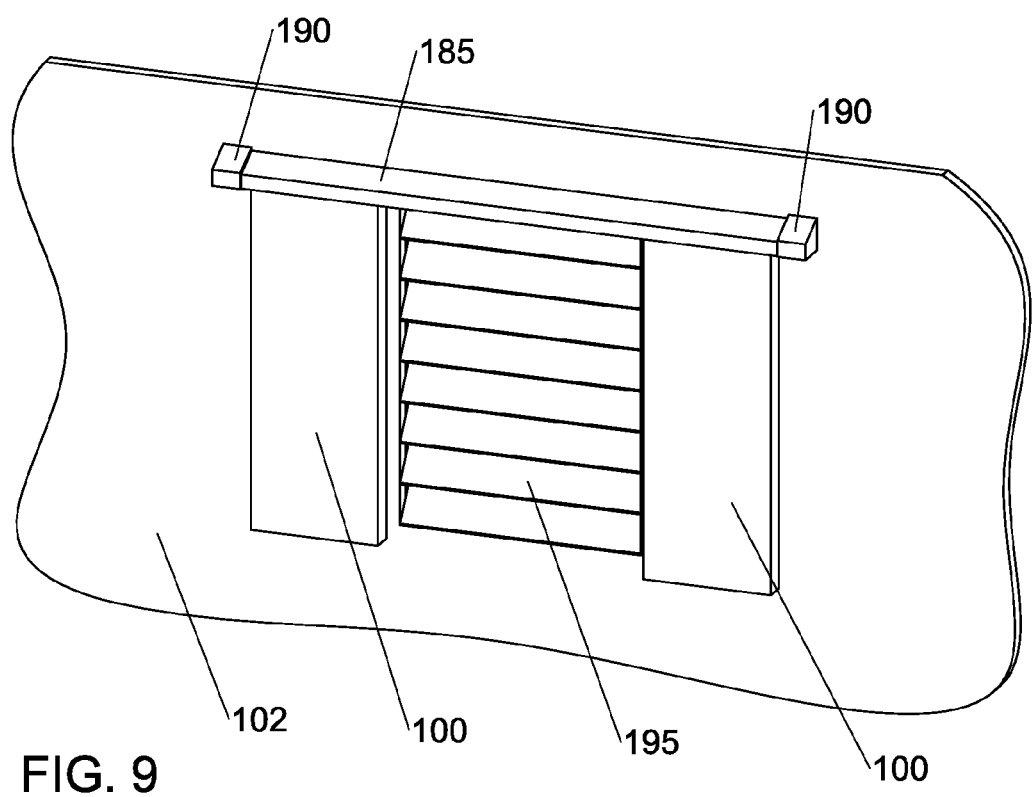

FIG. 9 shows a perspective view of an embodiment of the invention.

| Reference numbers: | |
|---|---|
| 100 | Shutter |
| 101 | Window or other opening |
| 105 | Means deployed on each shutter for opening and closing each shutter |
| 110 | Processor |
| 115 | Memory means |
| 120 | Plurality of remote sensor devices |
| 125 | Rechargeable batteries |
| 130 | Remote power supply |
| 131 | Plug-in ac wall adapter |
| 135 | Photovoltaic array |

-continued

Reference numbers:

| | |
|---|---|
| 140 | Means for both directly and remotely programming the controller |
| 145 | Transceiver |
| 150 | Means deployed on each shutter for powering each controller and each transceiver and each means for opening and closing each shutter |
| 155 | Set of light-emitting diodes |
| 160 | Bracket |
| 165 | Electrical gear motor |
| 170 | Jack screw |
| 175 | Infrared sensor |
| 180 | Small package |
| 185 | Top fixed element |
| 190 | End caps |
| 195 | Air inlet |
| 200 | Wetted medium |
| 205 | Fan |
| 210 | Pump |
| 215 | Pet door |
| 220 | Switch |
| 225 | Occupancy sensor |
| 230 | Electronic key |
| 235 | Drive mechanism |
| 240 | Drive nut |
| 245 | Side Subframe |
| 250 | Bottom Subframe |
| 255 | Top of shutter frame |
| 260 | Trailing edge of shutter frame |
| 265 | Bottom of shutter frame |
| 270 | Leading edge of shutter frame |
| 275 | Shutter facade |
| 280 | Insulation |
| 285 | Back shutter liner |

WRITTEN DESCRIPTION

Fenestration system means shutter plus window.

Shutters means a single shutter or a pair of shutters situated at a single window or other opening.

Network means both wired and wireless networks.

Figure 1:
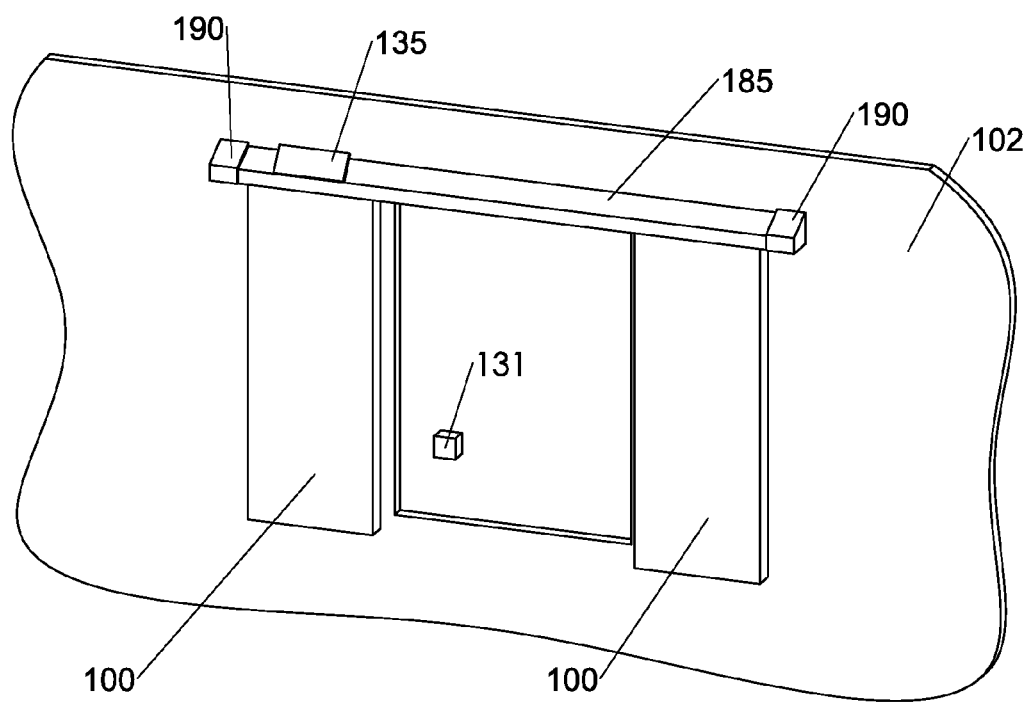
FIG. 1 shows a perspective view of the system.

In the preferred embodiment, as shown in FIG. 1, an electrical insulating shutter system for use on a local operating network comprises a plurality of shutters 100 for covering a window or windows or another opening or openings of a building, at least one shutter moveably situated over each window or each other opening 101; a means deployed on each shutter for opening and closing each shutter 105; a controller 110, preferably a microprocessor, deployed on each shutter 100 or pair of shutters and programmed to execute one or more software application tasks stored in a memory means 115 for storing information, receive information over the local operating network from a plurality of remote indoor and outdoor sensor devices 120 and from other controllers 110 that are remote, and transmit information over the local operating network to other controllers 110, wherein the controller 110 is not located within the same housing as the plurality of sensors 120. The controller 110 tailors power from either a set of rechargeable batteries 125 that are on-board the shutter or that comes from a remote power supply 130, typically a small plug-in ac wall adapter 131. The system charges the batteries 125 by means of the remote power supply 130 or from a small photovoltaic array 135 mounted on the shutter 100 or from both. The system also conditions the power to supply the remainder of the electronic system and supplies power to actuate the motor that opens and closes shutters 100. Each shutter 100 is programmed through a means for both directly and remotely programming the controller 105 such as a wireless infrared or radio frequency hand-held remote akin to a TV remote or via a remote lap-top or desk-top computer; a communications transceiver 130 for transmitting and receiving data between the controller 105 and the local operating network, at least one transceiver 145 deployed on each shutter; a means 150 deployed on each shutter 100 for powering each controller 105 and each transceiver 145 and each means for opening and closing each shutter 105; and the plurality of remote indoor and outdoor sensor devices 120, each sensor device 120 adapted to measure a physical phenomenon, each sensor device 120 producing an output signal, each sensor device 120 providing input to the controller 105 through the local operating network 90, the sensor devices 120 not all placed together within a single housing, the sensor devices 120 situated both inside of and outside of the building. The present invention is intended to function within a local operating network or network-based control system incorporating multiple devices having different functionality.

It is plausible that in many installation scenarios not all shutters 100 will be physically able to communicate with every other shutter 100 in the system. To maximize the likelihood of communication to all shutters 100, each shutter 100 employs a transceiver that further comprises a repeater function which can pass on received messages to other shutters. To help prevent interference from other devices and/or other shutter installations located nearby, in an alternate embodiment the transceiver 145 further comprises a circuit for utilizing unique codes, by means of which an entire system may be programmed to act on messages sent only to a specific address, discarding all others. Alternatively, the transceiver 145 can select from different channels. The controller 105 can respond to signals directly from an electrical device selected from the group consisting of a user via remote infrared, a wireless computer, a wired switch, a wired controller, and a computer. The controller 105 can be remotely programmed, for example by an electrical device selected from the group consisting of a user via remote infrared, a wireless computer, and a wired switch.

In the preferred embodiment, as shown in FIGS. 8 and 9, the means deployed on each shutter 100 for opening and closing each shutter 100 comprises a direct current electric gear motor 165 that acts on a jack screw 170 fastened via a drive nut or nuts 240 to the shutter 100. The jack screw may have two parts, one with left hand threads, the other with right hand threads, thereby enabling it to open and close a pair of shutter elements by simultaneously driving them in opposite directions while rotating the drive shaft in only one direction. In the preferred embodiment, the electric gear motor 165 is remotely controllable through the communications transceiver 145. It may also be manipulated directly from its own controller fastened on its shutter in response to information from environmental sensors. It is also possible to use a belt or chain drive for moving vertical shutters of the conventional European variety that rotate on their y-axes and for accordion folding shutters.

In the preferred embodiment, the controller 105 illuminates a set of light-emitting diodes 155 which signal the status of the mode of operation of the system, need for maintenance, and alarm. These status lights are co-located along with an infrared sensor 175 in a small package 180 visible by users just outside at the top of existing windows 101. When required by installations of the system of shutters in which the building may be particularly well shielded from the passage of radio frequency energy (e.g., a home equipped with aluminum siding) this package may also contain one or more additional transceivers and associated antennas to enhance communications from inside to outside of the building and from shutter to shutter.

The means for powering the controller 105 and the transceiver 145 is selected from the group consisting of a remote power supply 130, a battery or batteries 125, or both.

Toward controlling energy flow and being able to detect dangerous circumstances, sensor devices 120 may be located in several places. The preferred embodiment places the sensor devices 120 on a top fixed element 185 of each shutter 100 where local circumstances relevant to radiant energy flow through a window/shutter system (like shading from a nearby oak) can be sensed and used to automatically set the appropriate shutter configuration to optimize energy performance. In the preferred embodiment, the fixed element 185 is a bracket 160 positioned on the side of the building. This bracket 160 contains batteries 125, motor, drive mechanism 235, electronics, a small photovoltaic solar panel 135, a drip edge, two weather strips to seal the shutters 100 that move below it, an upper and lower rail that supports the nylon or steel roller bearings that attach to the top shutter frames below and supports the shutters while allowing them to move, and has two end caps. The sensor devices 120 are typically located in the end caps 190 of this bracket 160.

Optimizing Shutter Position

The following terms are useful for the subsequent discussion on optimizing energy performance: Solar Intensity in Btu/sq ft is a variable measured in real time by a sensor at each shutter; outside air temperature (dry bulb OAT) is a variable measured in real time by a sensor at each shutter. In addition, indoor air temperature (IAT), window heat transfer coefficient (U value), window solar heat gain coefficient (SHGC), shutter heat transfer coefficient, OAT winter threshold, OAT summer threshold, summertime insolation threshold, and time delay for opening or closing when in the automatic mode (which optimizes energy performance) are used in the algorithm governing shutter opening and closing. These parameters, their units in the inch-pound system, and range of typical values are specified in the table below:

| Parameter | Units | Typical values |
|---|---|---|
| IAT | Degrees F. | 50 to 90 |
| Window heat transfer coefficient | U value (Btu/sq ft/degree F.) | 0.2 to 1.1 |
| Window SHGC | Unitless number between 0 and 1 | 0.2 to 0.9 |
| Shutter heat transfer coefficient | U value (Btu/sq ft/degree F.) | 0.06 to 0.13 |
| OAT winter threshold | Degrees F. | <60 |
| OAT summer threshold | Degrees F. | >80 |
| Insolation summertime threshold | Btu/sq ft | >60 |
| Time delay for auto open/close | Minutes | 0 to 30 |

Winter: When the shutter is open, the shutter open net loss through a square foot of window is given by (solar intensity× SHGC of the window)−[window $U*(70-OAT)$], where the units are Btu/hr/sq ft. When (1) the system is in auto mode (which optimizes energy performance); (2) the OAT winter threshold criterion is met, e.g., OAT is <60 F; (3) net losses are negative for the length of the time delay or greater, the command is given to close the shutter. When the shutter is closed, the shutter closed net loss in Btu/hr/sq ft becomes $[(Uw*Us)/(Uw+Us)]*(70-OAT)$, where Uw and Us are the U values of the window and shutter respectively and 70 is an assumed value of TAT under the preferred embodiment; it may be a measured value if desired. When the shutter open net loss minus the shutter closed net loss becomes positive for the length of the delay period (e.g., 15 minutes), the command is given to open the shutter.

Summer: The equations are the same for the summer, but of course the net loss is positive whenever the OAT is above 70 F. The greater the OAT and the intensity of the sun, the larger the shutter-open net loss will be. When (1) the system is in auto mode (which optimizes energy performance); (2) the OAT summer threshold criterion is met, e.g., OAT is >80 F; (3) net losses are positive and exceed the insolation summer threshold for the length of the time delay or greater, the command is given to close the shutter. Just as the winter case, when the shutter is closed, the shutter closed net loss becomes $[(Uw*Us)/(Uw+Us)]*(70-OAT)$, where Uw and Us are the U values of the window and shutter respectively. In the summer, when the shutter open net loss minus the shutter closed net loss becomes less than the insolation summer threshold for the desired time delay (e.g., 15 minutes), the command is given to open the shutter.

Application to Evaporative Coolers

Evaporative coolers require the movement of air through a wetted medium 200 to lower the temperature of the air. Routinely, a fan 205 for pumping air and the wetted medium 200 are co-located, but this is not a necessary condition for effective functioning of a cooling system that makes use of the evaporation of water. In the two generic configurations discussed below, case one envisions a conventional evaporative cooler (either direct or indirect); case two envisions separating the air-moving function (typically by using one or more fans 205, but natural ventilation is also possible) from the wetted medium 200 through which air flows thereby becoming cooled.

Figure 2:
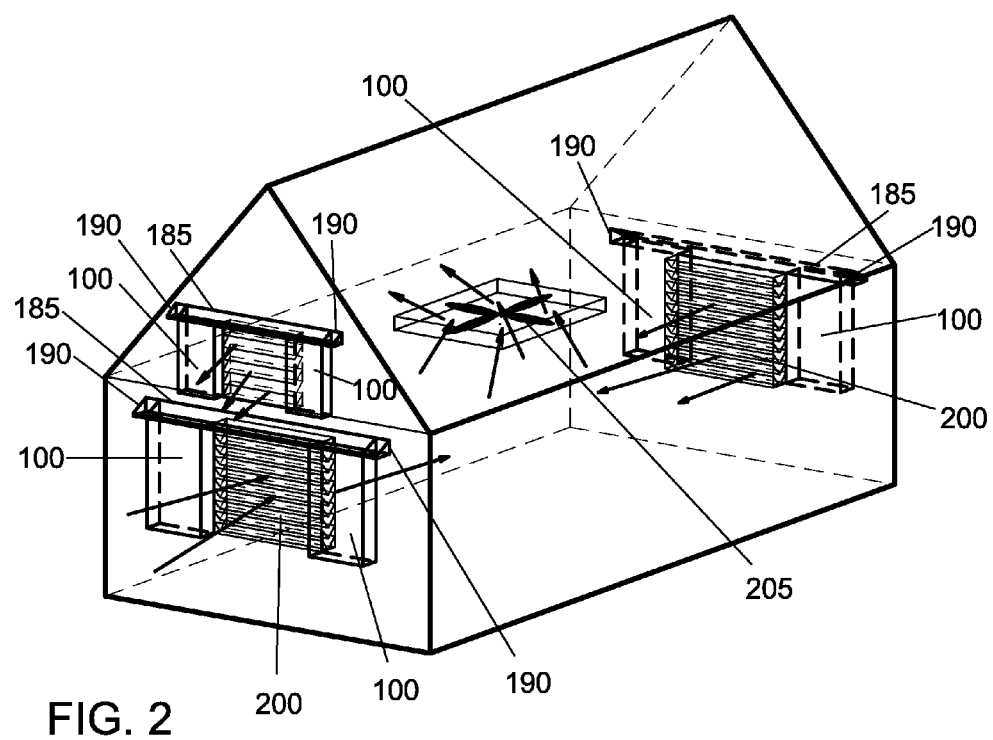
FIG. 2 shows an insulating shutter over an air inlet to an evaporative cooler.

Case 1: As shown in FIG. 2, closing an insulating shutter or shutters 100 over an air inlet 195 to an evaporative cooler to prevent unwanted drafts during weather conditions when the cooler is not needed thereby saves energy, increases comfort, aids cooler maintenance, and increases the useful lifetime of the cooling equipment.

The insulating shutter system may function all year around, even during the summer months between cooling cycles. Appropriate control of the shutter(s) 100 improves energy efficiency, lowers risk of water freezing (in supply or return pipes, evaporative cooling media, in the reservoir under media, or in pumps), automates substantial elements of seasonal maintenance cycles for evaporative coolers, and obviates the need for most others.

Figure 3B:
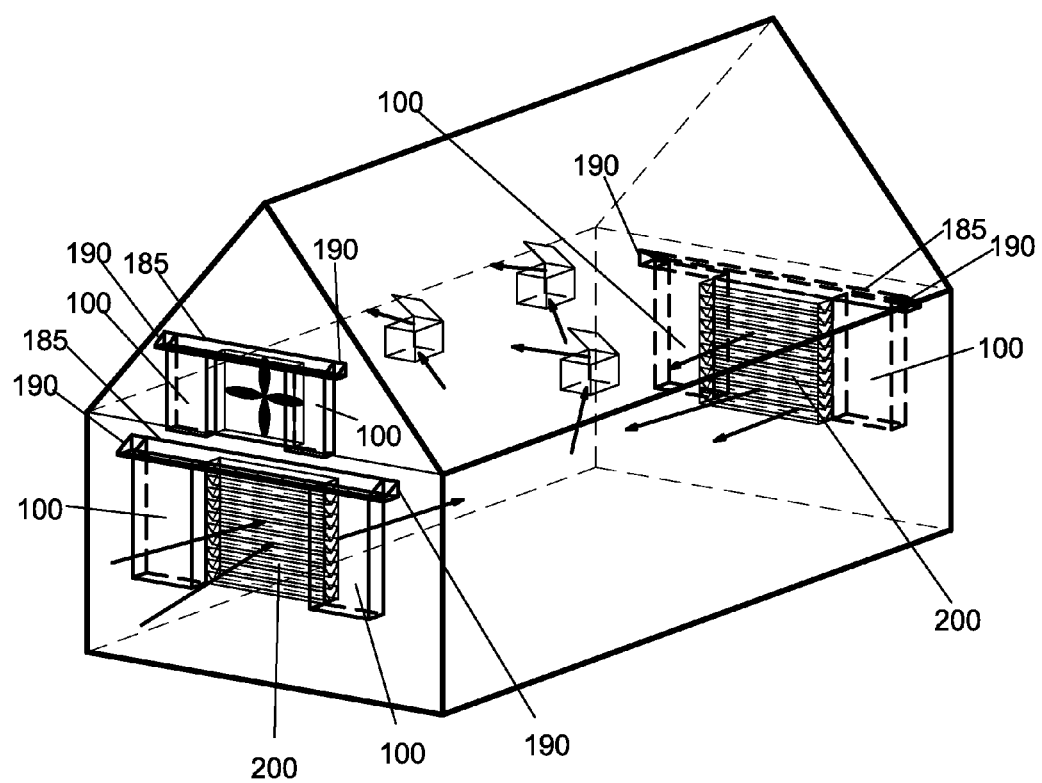

Case 2: As shown in FIGS. 3A and 3B, when the fan 205 is separated from the wetted medium 200 (e.g., as with a window fan, whole house fan in floor of attic, in gable of attic, elsewhere), and the medium is located in a dedicated opening in the sidewall of a building or a window area, a shutter 100 of any of the above configurations can be used to cover the medium from the outside, inside, or both. The preferred embodiment envisions an insulating shutter 100 on the outside with a grille on the inside hinged to facilitate maintenance of the wetted medium 200. In practice, when a thermostat calls for evaporative cooling (or a switch is operated manually), the insulating shutter 100 opens, the medium 200 is wetted by a small pump 210 moving water from a reservoir below the medium, and the fan 205 comes on. When the thermostat is satisfied (or the user is comfortable), the fan 205 and pump 210 are turned off and the insulating shutter is closed.

Variations on the theme include using insulating shutters 100 on the outside or inside of the fan 205, using multiple fans 205 and/or using multiple through-the-wall evaporative cooling media, each protected by appropriate automated insulating shutters 100. Note that the shutters 100 used with evaporative coolers may be aesthetically coordinated with those used on fenestration in the building.

Shutters 100 may be installed within walls made of structural insulating panels (SIPs) (or related wall configurations) to form pockets akin to pocket doors. Such shutters 100 can protect evaporative cooling media 200, fans 205, or duct openings 195 from being exposed to inclement weather while air sealing and insulating the structure when evaporative cooling is not needed. The pocket that houses the insulating shutter could be to the left or right of window, both left and right; above or below or both. A key element of this approach is to have ample wall insulation no matter what the instantaneous position of the shutters 100 happens to be. Of course, there will be more insulation when the shutters 100 are fully open since this configuration has the shutters 100 in parallel with fixed wall insulation so their R values are additive.

In general, shutters 100 are not visible except when closed. This may have aesthetic advantages in a number of applications and will protect the shutters 100 from weather and mechanical abuse, thereby giving them a longer life.

The evaporative cooler media 200 can be installed within SIPs walls with shutters 100 outside the panels, inside the panels, and within the panels. Other prefabricated and site-built wall types both new and retrofit can be configured with any or all of the above. The key point is to integrate shutter technology and evaporative cooler technology in prefabricated panels, thereby facilitating efficient assembly on a construction site for both new and retrofit buildings ranging from dog houses, sheds, and green houses to residential, commercial, and industrial buildings of a wide range of sizes and applications.

Pet Doors

Existing pet doors 215 are effectively holes in the conditioned envelope of buildings. Even those equipped with swinging doors have the undesirable property of opening wide when the wind blows, allowing unwanted air infiltration which wastes energy and causes discomfort. As shown in FIG. 4, an elegant solution to the problem may be achieved by using an automated insulating shutter 100 that slides either horizontally or vertically at a slow rate over the pet door 215, yet seals and insulates thoroughly when in place. The shutter 100 that is the subject of this disclosure can be toggled by a switch 220 on a wireless controller 110, by a local wired switch 220 actuated by a pet stepping on a mat, or by an occupancy sensor 225. In this latter case, the occupancy sensor 225 may be equipped to respond to an electronic key 230 on the pet's collar in conjunction with the pet's movement or not, as desired. This serves to ensure that only the animal(s) desired can gain access to the dwelling or be allowed to gain access to the outdoors through the pet door. In all events, when the shutter 100 opens, it produces an "opening" tone and when closing a "closing" tone to alert both pet and homeowner. The volume control may be set to achieve the desired results of habituating the animal to actions of the pet door while minimizing human disenchantment. The shutter 100 opens, detects the traverse of the pet through the doorway (e.g., with a micro-switch on a swinging element or by breaking an infrared pathway), and closes after an adjustable time delay, typically 15 seconds. The current drawn by the motor that actuates the pet door is monitored so that if it rises above a preset level, its control logic draws the inference that a pet or other object may be in the way of the movement and the shutter automatically opens for a preset time, then initiates a closing sequence. If the problem recurs a number of times (preset by the user), it remains open and sets a "maintenance needed" flag.

Non-Energy-Related Sensing and Controlling

Electronics provides a "soft start" for the gear motor 165 that opens and closes the shutter 100 using pulse-width modulation. This keeps peak loads on the battery 125 low and lowers wear on the motor, gears, and drive mechanism. The electronics also monitor the instantaneous current flow to the motor, which allows for (1) breaking ice when necessary and (2) providing a measure of safety in case of an obstruction (e.g., a body part) that inhibits opening or closing. Electronics for sensing exterior fires are optionally mounted in an end cap 190. Optionally, an ultraviolet sensor with appropriate signal processing circuitry optimizes sensitivity to fire while minimizing false alarms. Optionally, an infrared sensor with appropriate signal processing circuitry optimizes sensitivity to fire while minimizing false alarms. Optionally, in alarm mode, the electronics produces an "all closed" signal which is transmitted and retransmitted via the aforementioned radio to all shutters in the network.

Optionally, electronics for sensing and signaling high winds or gusts is also mounted in an end cap 190 of the upper extrusion of one or more shutters on a building. The apparatus detects pressure differences between ports of a sensitive electronic pressure sensor as well as the time rate of change of pressure differences to signal an alarm owing to high average winds or high gusts, both of which signal the need for shutter closings.

Inside smoke, fire, and CO detection uses off-the-shelf sensors. Our technology uses a small, dedicated, self-contained box with radio and acoustic sensors with associated signal processing to sense when a smoke/fire/CO detector is in alarm mode (while eliminating false alarms from other sound sources.) When an alarm is sensed and verified, a radio signal is sent to all shutters on the system (all of which retransmit to ensure all are contacted) resulting in the opening of all shutters. This improves indoor air quality and facilitates speedy and safe egress.

Commercially-available acoustic and related sensors that detect glass breakage possibly due to a hurled object or bullet initiate shutter closing in ways similar to smoke alarms (that is, either hard wired or wirelessly via the radio that communicates between shutters and from sensors to shutters).

A hand-held or wall-mounted control akin to a TV remote control that transmits and receives using infrared line-of-sight has buttons that allow for the user to override all other commands and immediately open or shut all shutters or groups of shutters as desired. The remote can also be used to set up the shutters during installation.

More sophisticated control is also possible via a remote laptop or desk-top computer using wireless technology via a USB (or similar) dongle. This technology enables detailed control of opening and closing schedules of each shutter, including partial opening and closing to facilitate wake ups in bedrooms, ensure privacy as desired, accommodate special social functions within a household, or to control natural light levels in various spaces. This also allows for remote control from anywhere on the globe via the World Wide Web. It also allows for inputs from outside data (such as NOAA) to make predictive control decisions.

Demonstration and Testing

In order to test the multiple functions of the shutter system and to record data under a range of environmental circumstances both in the laboratory and in the field, a system has been designed to actuate shutters using the sensors discussed above while monitoring voltages, currents, and temperatures of various components. Data thus gathered is both stored for subsequent analysis and displayed in real time via dedicated electronics. These in turn communicate with a computer programmed with dedicated software. This same system is also employed to demonstrate the functionality of the system to others in pedagogical or sales environments.

Mechanical

In the preferred embodiment, as shown in FIGS. 5A and 5B, the shutters 100 use very low thermal conductivity insulation such as polyisocyanurate closed-cell foam in board form, urethane in foam or board forms, or aerogels. Aluminum or plastic extrusion or fiberglass pultrusions (preferred embodiment) are employed as borders for the moveable insulating elements and as fixed sub-frames to support the moveable elements of the shutters 100 and to house electrical, electronic, and mechanical components, including the drive mechanism and the weather sealing system. In the preferred embodiment, eight extrusions (or pultrusions) are employed for a typical system. These fit together precisely to facilitate quality control and speed of assembly, ensure mechanical stability under a wide range of weather conditions, and minimize air leakage.

In the preferred embodiment, as shown in FIG. 5a, the Shutter 100 utilizes a frame that employs four elements that fit together using eight screws, rivets, or similar fasteners. The elements are the Top of the Shutter Frame 255, the Leading Edge of the Shutter Frame 270, the Trailing Edge of the Shutter Frame 260, and the Bottom of the Shutter Frame 265. Each is element is mitered at 45 degrees in the manner of picture frame to ensure an accurate fit and to accommodate other portions of the shutter. The top and bottom elements 255, 265 are each equipped with screw bosses which both provide strength and allow for screws or rivets in the tops and bottoms of the leading and trailing edges of the shutter frame 270, 260 to secure the frame together.

Each of the four elements includes U-shaped elements of identical dimensions that accommodate, support, and hold in place Insulation 280 and the Back Shutter Liner 285 that are typically sandwiched together. The insulation may be made of rigid board construction, a sprayed in foam, a combination of the two, or board insulation with gaps between low-emissivity surfaces to form radiant barriers, thereby enhancing the net insulating value achieved by the system.

Each of the four elements also includes smaller U-shaped elements at their fronts enabling them to accommodate, support, and hold in place material that forms the Shutter Façade 275.

The Top of the Shutter Frame 255 has a vertical protrusion whose locus and shape enables the attachment of ball-bearing or bushing-style rollers that fit the track in the Top Fixed Element 185, thereby enabling the movement of the shutter in the plane parallel to the window or other opening being shuttered. The vertical Trailing Edge of the Shutter Frame 260 has a protrusion parallel to the side edge that upon complete closure of the shutter, slightly compresses the weather strip on the Side Subframe 245 thereby contributing to air and water sealing the system when the shutters are closed.

The Leading Edges of the Shutter Frame 270 are designed so that one has a pair of weather strips that are slightly compressed by the U-shaped leading edge of the other shutter frame, thereby contribution to air and water sealing the system when the shutters are closed.

In addition to sharing the properties of holding the façade, insulation, and back shutter liner of the other three elements of the shutter frame, the back of the Bottom of the Shutter Frame 265 is equipped with a U-shaped protrusion that enfolds the pair of weather strips on the Bottom Subframe 250. In addition to contributing to air and water sealing the system when the shutters are closed, this allows the shutter to slide back and forth while being held at a constant distance parallel to the window or other opening being shuttered.

FIG. 5B shows the subframe assembly. The two Side Subframes 245 are made of the same extrusion, only one of them is rotated 180 degrees in the x-y plane in assembly. They are attached to the back of the Top Fixed Element 185 with the distance between them just shy of the width of the pair of shutters when they are closed. The length of the Top Fixed Element itself is twice the width of the pair of shutters when closed. The Side Subframes are parallel to each other and are attached to the Bottom Subframe 250 at initial assembly, thereby holding these key parts together in a rectilinear form. The Bottom Subframe is perpendicular to the Side Subframes and therefore parallel to the Top Fixed Element. Its length is 1.5 times the width of the pair of shutters when closed.

In installation, the Side Subframes are secured to the existing frame of the window with screws. The left Side Subframe holds a vertical weather strip on its left edge facing left and the right Side Subframe holds a vertical weather strip on its right edge facing right. Accordingly, at the moment of full closure, the back edges of the outer frames of the shutters touch (and lightly compress) the weather strip associated with their corresponding Side Subframes. The design is such that the Side Subframes are always hidden behind the shutters, regardless of the shutters' positions.

The Bottom Subframe holds a pair of back-to-back horizontal weather strips and is located so that the U shape at the back of the bottom of each shutter wraps around the Bottom Subframe assembly, slightly compressing each of the weather strips while never touching the Bottom Subframe itself. This allows the shutters to slide with minimal friction—while holding them constantly secured in the plane of the side of the building as they open and shut—and ensures that they are sealed when fully shut.

In the preferred embodiment, a pair of shutters 100 is designed to move horizontally rather than hinging. This keeps the outside surface always to the outside, optimizes air sealing when closed, and minimizes shearing forces when opening or closing shutters 100 under conditions that include high or gusty winds, perhaps acerbated by driving rain, sleet, or snow. In the process of being fully closed, they meet in the middle where a male extrusion equipped with a pair of weather strips slides into a female extrusion where it nestles tightly for a cold winter's night—or a hot summers afternoon. The moving elements are equipped with rollers that are suspended on the rail of an upper extrusion and slide between a pair of weather strips. The bottom extrusion of each shutter 100 is equipped with U-shaped elements that envelop a pair of fixed weather strips affixed to an element of a lower subframe extrusion that is parallel to the upper extrusion that contains the rail for the rollers. The up-facing U shape on the back of shutters 100 is always between the shutter 100 and the building on which it is installed, so is only minimally exposed to dirt, trash, or moisture. The fixed weather strips on the lower sub-frame extrusion point down, so are not prone to collect dirt, trash or moisture. This protects the shutter 100 from inclement weather and minimizes air leakage while ensuring that the shutter can slide freely. Vertical sub-frame fixed extrusions mate with the horizontal frame extrusions and are also equipped to hold weather stripping that upon closing, fits snugly with vertical extrusions on the shutters 100.

Each shutter 100 is a volume enclosed by four extrusions that form its border. Inside the border a shutter 100 constitutes a "sandwich," typically composed of three layers. The aforementioned insulation that may be on the order of 2.7 inches thick is at the center. In addition, the shutters 100 are equipped with an outer (front) surface and an inner (back) surface. The outer surface is typically a façade ranging from a few mils to half an inch thick, depending on desired aesthetics and functionality. The innermost surface is typically 15 mil thick white styrene, although a wide range of other options, including nothing at all, are possible. The outer façade may be fabricated of wood, aluminum, steel, other metals, plastics, (including Tevlar or other bullet-resistant material) or cementatious boards and related substances whose primary functions are to achieve fire resistance and a high degree of mechanical strength. Additionally, when light-transmitting characteristics are desired, an outer façade of plexiglass or glass itself may be chosen, followed by a light-colored fibrous insulation that transmits diffuse light. In such cases, the innermost element of the shutter sandwich may also be constructed of materials that facilitate the passage of light.

A variation may also be employed in which most of the shutter 100 is constructed of an opaque façade followed by high R insulation, with a section of that includes a clear façade followed by a light transmitting insulation material followed by a clear back surface that contains the fibrous insulation while allowing light to be transmitted. The configuration of the front façade may be chosen to allow various decorative shapes to be formed of the light-transmitting element of the shutter.

The local operating network may comprise twisted pair wiring, radio frequency communications, infrared communications, optical communication over optical fiber, power line carrier communications, coaxial communications, or others. The local operating network may utilize a standard protocol such as LonWorks, CEBus, X10, BACNet and CAN or any other proprietary or non-proprietary protocol.

The communications transceiver may comprise a twisted pair wiring transceiver, a radio frequency transceiver, a power line carrier transceiver, an infrared transceiver, an optical fiber transceiver, a coaxial cable transceiver, or others.

The controller may comprise a microprocessor, or custom integrated circuit, or others.

The memory means may comprise random access memory, read only memory, electrically erasable programmable read only memory, or others.

The sensor device may comprise a motion sensor, an ambient light sensor, an indoor temperature sensor, an outdoor temperature sensor, a solar intensity sensor, a net pyranometer, an ultraviolet sensor having a zone of sensitivity and with or without a signal processing circuit that optimizes sensor sensitivity while minimizing false alarms, an infrared sensor with or without a signal processing circuit that optimizes sensor sensitivity while minimizing false alarms, an auditory sensor, a visual sensor, a carbon monoxide sensor, a fire sensor, a smoke sensor, or an alarm system, the alarm system sending alarm signals to the controller through the local operating network. The auditory sensor optionally can recognize warning signals from alarms such as fire alarms, smoke alarms, and carbon monoxide alarms. It might employ signal processing circuitry to minimize false detections from other non-alarm sources of sound.

FIG. 6 show a block diagram of the shutter electronics. FIG. 7 shows a flowchart of the controller program.

The software application tasks may comprise opening and closing software application code for opening and closing each shutter, ambient light level software application code for maintaining a particular light level within an area, reset software application code for placing the device in an initialization state, go unconfigured software application code for placing the device in an unconfigured state, communication input/output software application code for receiving data from and/or transmitting data to the local operating network, inhibit software application code for inhibiting and overriding the normal operating mode of the device, indoor air temperature software application code for measuring and processing the indoor temperature of the indoor area surrounding an electrical air temperature measuring sensor, outdoor air temperature software application code for measuring and processing the outdoor temperature of the outdoor area surrounding an electrical air temperature measuring sensor, temperature and insolation software application code for providing open, close, and partially opening operating signals to the shutters, fast change application code for detecting rapid increases in sensor data and in response thereto sending a warning message over the local operating network, winter application code for operating in winter, summer application code for operating in summer; winter application code wherein when the net loss of the fenestration system with the shutter closed is greater than the net loss with the shutter open for the length of a variable specifiable delay period, the winter application code issues a command to open the shutter, and when the net loss of the fenestration system with the shutter open is greater for the length of a variable specifiable delay period than would be the case if the shutter were closed, the winter application code issues a command to close the shutter; summer application code wherein when the outside air temperature exceeds a specified temperature and insolation falling on the fenestration system exceeds a specified threshold for a variable specifiable delay period, the summer application code issues a command to close the shutter, and when the shutter open net loss minus the shutter closed net loss becomes less than the insolation summer threshold for a variable specifiable delay period, the summer application code issues a command to open the shutter; alarm response application code for detecting alarm signals and in response thereto sending a warning message over the local operating network and opening or closing the shutter, or ultraviolet and/or infrared sensor application code for optimizing sensitivity to flames in the zone of sensitivity of the ultraviolet sensor while minimizing false alarms from the sun and other non-threatening sources.

Regarding the fast change application code for detecting rapid increases in sensor data, in one embodiment wind velocity is sensed with a simple pressure gauge. Inferences are drawn as to adopting a "close shutter" state when the pressure exceeds a threshold representing (say) 40 mph. Optionally the first derivative (rate of change of pressure) of the signal is examined to infer gusting conditions, setting a suitable threshold for gust rate.

Optionally, the shutter or pair of shutters is neither a master nor a slave to any other shutter or pair of shutters in the system.

Optionally, the shutter or pair of shutters is moveably situated over a pet door.

Optionally, the shutter or pair of shutters is moveably situated over an air inlet or outlet.

Optionally, the shutter is insulating.

Optionally, the shutter is equipped with fire-proof facades.

Optionally, the system further comprises electronics that provide a soft start for the gear motor that opens and closes the shutter using pulse-width modulation.

Optionally, the processor monitors the instantaneous current flow to the motor.

Optionally, electronics for sensing fires are mounted in the plurality of shutters.

Optionally, the processor produces an "all closed" signal or an "all open" signal as appropriate which is transmitted and retransmitted via the transceivers to all shutters in the network.

Optionally, electronics for sensing and signaling high or gusty winds are mounted in an end piece of the upper extrusion of one or more shutters on a building.

Optionally, the system further comprises a set of light-emitting diodes which signal the status of the mode of operation of the system, need for maintenance, and alarm. The set of light-emitting diodes may be co-located along with an infrared sensor in a small package just outside at the top of existing windows. The radio may also be co-located in the small package.

Optionally, the system further comprises electronics for sensing and signaling high or gusty winds, the electronics being mounted together in a housing for outdoor mounting.

Most generally, the embodiments of the invention comprise an electrical insulating shutter system for use on a local operating network comprising:
A. at least one shutter or pair of shutters for covering a window or windows or other opening or openings of a building, the shutter or pair of shutters moveably situated over the window or windows or other opening or openings;
B. a means deployed on each shutter for opening and closing each shutter or pair of shutters;
C. a decision-making logic means deployed on each shutter or pair of shutters, said logic means having the ability to: execute one or more logic tasks; receive information over the local operating network from a plurality of indoor and outdoor remote sensor devices and from other decision-making logic means that are remote; transmit information over the local operating network to other decision-making logic means; wherein the decision-making logic means is not located within the same housing as the plurality of sensors;
D. a means for both directly and remotely programming the decision-making logic means;
E. a communications transceiver for transmitting and receiving data between the decision-making logic means and the local operating network, at least one transceiver deployed on each shutter;
F. a means deployed on each shutter or pair of shutters for powering each decision-making logic means and each transceiver and each means for opening and closing each shutter or pair of shutters; and
G. the plurality of indoor and outdoor remote sensor devices, each sensor device adapted to measure a physical phenomenon, each sensor device producing an output signal, each sensor device providing input to the decision-making logic means, the sensor devices not all placed together within a single housing, the sensor devices situated both inside of and outside of the building.

Most generally, the decision-making logic means is a decision-making logic means selected from the group consisting of a programmable controller, a Complex Programmable Logic Device (CPLD), a Field-Programmable Gate Array (FGPA), and transistors on a PCB.

In the preferred embodiment, as described in detail above, the decision-making logic means is a controller and the logic tasks are software application tasks. In embodiments wherein the decision-making logic means is not a controller but is a CPLD, a FGPA or transistors, the software application tasks and code as discussed above are more generally logic tasks and application logic.

Method for Manufacturing an Electrical Shutter System

The embodiments of the invention further comprise a method for manufacturing an electrical insulating shutter system for use on a local operating network comprising:
A. providing at least one shutter or pair of shutters for covering a window or windows or other opening or openings of a building, the shutter or pair of shutters moveably situated over the window or windows or other opening or openings;
B. providing a means deployed on each shutter for opening and closing each shutter or pair of shutters;
C. providing a decision-making logic means deployed on each shutter or pair of shutters, said logic means having the ability to: execute one or more logic tasks; receive information over the local operating network from a plurality of indoor and outdoor remote sensor devices and from other decision-making logic means that are remote; transmit information over the local operating network to other decision-making logic means; wherein the decision-making logic means is not located within the same housing as the plurality of sensors;
D. providing a means for both directly and remotely programming the decision-making logic means;
E. providing a communications transceiver for transmitting and receiving data between the decision-making logic means and the local operating network, at least one transceiver deployed on each shutter;
F. providing a means deployed on each shutter or pair of shutters for powering each decision-making logic means and each transceiver and each means for opening and closing each shutter or pair of shutters; and
G. providing the plurality of indoor and outdoor remote sensor devices, each sensor device adapted to measure a physical phenomenon, each sensor device producing an output signal, each sensor device providing input to the decision-making logic means, the sensor devices not all placed together within a single housing, the sensor devices situated both inside of and outside of the building.

Optionally, in the preferred embodiment the providing a means deployed on each shutter for opening and closing each shutter step comprises providing a direct current electric gear motor that acts on a jack screw fastened via a drive nut or nuts 240 to the shutter.

All of the other features described above in this written disclosure can be added to this system through additional steps.

Some advantages of the embodiments of the apparatus were previously enumerated in the Summary section. Every advantageous feature does not need to be incorporated into every embodiment of the apparatus and/or methods.

Although these versions of the invention have been described in considerable detail, other versions are possible. For example, different multiple dependent claims may be combined in different embodiments. Therefore, the spirit and scope of the appended claims should not be limited to the description of the versions contained therein.

We claim:

1. An electrical insulating shutter system for use on a local operating network comprising:
   A. at least one shutter or pair of shutters for covering a window or windows or other opening or openings of a building, the shutter or pair of shutters moveably situated over the window or windows or other opening or openings;
   B. a means deployed on each shutter for opening and closing each shutter or pair of shutters;
   C. a decision-making logic means deployed on each shutter or pair of shutters, said logic means having the ability to: execute one or more logic tasks; receive information over the local operating network from a plurality of indoor and outdoor remote sensor devices and from other decision-making logic means that are remote; transmit information over the local operating network to other decision-making logic means; wherein the decision-making logic means is not located within the same housing as the plurality of sensors;
   D. a means for both directly and remotely programming the decision-making logic means;

E. a communications transceiver for transmitting and receiving data between the decision-making logic means and the local operating network, at least one transceiver deployed on each shutter;

F. a means deployed on each shutter or pair of shutters for powering each decision-making logic means and each transceiver and each means for opening and closing each shutter or pair of shutters; and G. the plurality of indoor and outdoor remote sensor devices, each sensor device adapted to measure a physical phenomenon, each sensor device producing an output signal, each sensor device providing input to the decision-making logic means, the sensor devices not all placed together within a single housing, the sensor devices situated both inside of and outside of the building, wherein the logic task or tasks comprise winter application logic for operating in winter, wherein the logic task or tasks comprise summer application logic for operating in summer, wherein when net loss of the electrical insulating shutter system with the shutter or shutters closed is greater than net loss with the shutter open for the length of a variable specifiable delay period, the winter application logic issues a command to open the shutter or shutters, and when net loss of the electrical insulating shutter system with the shutter or shutters open is greater for the length of a variable specifiable delay period than would be the case if the shutter or shutters were closed, the winter application logic issues a command to close the shutter, wherein when outside air temperature exceeds a specified temperature and insolation falling on the electrical insulating shutter system exceeds a specified threshold for a variable specifiable delay period, the summer application logic issues a command to close the shutter or shutters, and when shutter open net loss minus shutter closed net loss becomes less than insolation summer threshold for a variable specifiable delay period, the summer application logic issues a command to open the shutter.

2. The system of claim 1, wherein the means deployed on each shutter or pair of shutters for opening and closing each shutter or pair of shutters comprises a direct current electric gear motor that acts on a jack screw fastened via a drive nut or nuts to the shutter or pair of shutters.

3. The system of claim 2, wherein the electric gear motor is remotely controllable through the communications transceiver.

4. The system of claim 1, further comprising a plurality of shutters or plurality of pairs of shutters or combinations thereof.

5. The system of claim 1, wherein the transceiver further comprises a repeater.

6. The system of claim 1, wherein the transceiver further comprises a circuit for utilizing unique codes.

7. The system of claim 1, wherein the transceiver can select from different channels.

8. The system of claim 1, wherein the means for powering the transceiver is selected from the group consisting of a remote power supply, a battery or batteries, or both.

9. The system of claim 1, wherein the local operating network comprises twisted pair wiring.

10. The system of claim 1, wherein the local operating network comprises radio frequency communications.

11. The system of claim 1, wherein the local operating network comprises infrared communications.

12. The system of claim 1, wherein the local operating network comprises optical communication over optical fiber.

13. The system of claim 1, wherein the local operating network comprises power line carrier communications.

14. The system of claim 1, wherein the local operating network comprises coaxial communications.

15. The system of claim 1, wherein the local operating network utilizes a standard protocol such as LonWorks, CEBus, X10, BACNet and CAN or any other proprietary or non-proprietary protocol.

16. The system of claim 1, wherein the communications transceiver comprises a twisted pair wiring transceiver.

17. The system of claim 1, wherein the communications transceiver comprises a radio frequency transceiver.

18. The system of claim 1, wherein the communications transceiver comprises a power line carrier transceiver.

19. The system of claim 1, wherein the communications transceiver comprises an infrared transceiver.

20. The system of claim 1, wherein the communications transceiver comprises an optical fiber transceiver.

21. The system of claim 1, wherein the communications transceiver comprises a coaxial cable transceiver.

22. The system of claim 1, wherein the sensor device comprises a motion sensor.

23. The system of claim 1, wherein the sensor device comprises an ambient light sensor.

24. The system of claim 1, wherein the sensor device comprises an indoor temperature sensor.

25. The system of claim 1, wherein the sensor device comprises an outdoor temperature sensor.

26. The system of claim 1, wherein the sensor device comprises a visual light sensor.

27. The system of claim 1, wherein the sensor device comprises a pyranometer.

28. The system of claim 1, wherein the sensor device comprises an ultraviolet sensor, the ultraviolet sensor having a zone of sensitivity.

29. The system of claim 1, wherein the sensor device comprises an infrared sensor, the infrared sensor having a zone of sensitivity.

30. The system of claim 28, wherein the ultraviolet sensor further comprises signal processing circuitry that optimizes sensor sensitivity while minimizing false alarms.

31. The system of claim 1, wherein the sensor device comprises an auditory sensor.

32. The system of claim 1, wherein the sensor device comprises a visual sensor.

33. The system of claim 1, wherein the sensor device comprises a carbon monoxide sensor.

34. The system of claim 1, wherein the sensor device comprises a fire sensor.

35. The system of claim 1, wherein the sensor device comprises a smoke sensor.

36. The system of claim 1, wherein the sensor device comprises an alarm system, the alarm system sending alarm signals to the controller through the local operating network.

37. The system of claim 1, wherein the sensor device comprises an occupancy sensor.

38. The system of claim 1, wherein the shutter or pair of shutters is neither a master nor a slave to any other shutter in the system.

39. The system of claim 1, wherein the shutter or pair of shutters is moveably situated over a pet door.

40. The system of claim 1, wherein the shutter or pair of shutters is moveably situated over an air inlet or outlet.

41. The system of claim 1, wherein the shutter or pair of shutters is insulating.

42. The system of claim 1, wherein the shutter or pair of shutters is equipped with fire-proof facades.

43. The system of claim 1, further comprising electronics that provide a soft start for the gear motor that opens and closes the shutter using pulse-width modulation.

44. The system of claim 43, wherein the processor monitors the instantaneous current flow to the motor.

45. The system of claim 1, wherein electronics for sensing fires are mounted in the shutter or pair of shutters.

46. The system of claim 1, wherein the decision-making logic means produces an "all closed signal" or an "all open signal" which is transmitted and retransmitted via the transceivers to all shutters or pairs of shutters in the network.

47. The system of claim 1, wherein electronics for sensing and signaling high winds are mounted in an end cap of the upper extrusion of one or more shutters or pairs of shutters on a building.

48. The system of claim 1, further comprising a set of light-emitting diodes which signal the status of the mode of operation of the system, need for maintenance, and alarm.

49. The system of claim 48, wherein the set of light-emitting diodes are co-located along with an infrared sensor in a small package just outside at the top of existing windows.

50. The system of claim 1, further comprising electronics for sensing and signaling high winds, the electronics mounted together in an housing for outdoor mounting.

51. The system of claim 1, wherein the decision-making logic means is a decision-making logic means selected from the group consisting of a programmable controller, a Complex Programmable Logic Device (CPLD), a Field-Programmable Gate Array (FGPA), and transistors on a PCB.

52. The system of claim 1, wherein the means for powering the decision-making logic means is selected from the group consisting of a remote power supply, a battery or batteries, or both.

53. The system of claim 1, wherein the decision-making logic means can respond to signals directly from an electrical device.

54. The system of claim 1, wherein the means for both directly and remotely programming the decision-making logic means comprises an electrical device selected from the group consisting of infrared transceiver, a radio transceiver, a wired switch, a wired controller, and a computer.

55. The system of claim 1, wherein the logic task or tasks are stored in a memory means for storing information.

56. The system of claim 55, wherein the memory means comprises random access memory.

57. The system of claim 1, wherein the logic task or tasks comprise opening and closing application logic for opening and closing each shutter.

58. The system of claim 1, wherein the logic task or tasks comprise ambient light level application logic for maintaining a particular light level within an area.

59. The system of claim 1, wherein the logic task or tasks comprise reset application logic for placing the device in an initialization state.

60. The system of claim 1, wherein the logic task or tasks comprise go unconfigured application logic for placing the device in an unconfigured state.

61. The system of claim 1, wherein the logic task or tasks comprise communication input/output application logic for receiving data from and/or transmitting data to the local operating network.

62. The system of claim 1, wherein the logic task or tasks comprise inhibit application logic for inhibiting and overriding the normal operating mode of the device.

63. The system of claim 1, wherein the logic task or tasks comprise indoor air temperature application logic for measuring and processing the indoor temperature of the indoor area surrounding an electrical air temperature measuring sensor.

64. The system of claim 1, wherein the logic task or tasks comprise outdoor air temperature application logic for measuring and processing the outdoor temperature of the outdoor area surrounding an electrical air temperature measuring sensor.

65. The system of claim 1, wherein the logic task or tasks comprise temperature and insolation application logic for providing open, close, and partially opening operating signals to the shutters.

66. The system of claim 1, wherein the logic task or tasks comprise fast change application logic for detecting rapid increases in sensor data and in response thereto sending a warning message over the local operating network.

67. The system of claim 1, wherein the logic application task or tasks comprise alarm response application logic for detecting alarm signals and in response thereto sending a warning message over the local operating network to open or close the shutter.

68. The system of claim 1, wherein the logic application task or tasks comprise ultraviolet sensor application logic for optimizing sensitivity to flames in the zone of sensitivity of the ultraviolet sensor while minimizing false alarms from the sun and other non-threatening sources.

69. The system of claim 1, wherein the logic application task or tasks comprise infrared sensor application logic for optimizing sensitivity to flames in the zone of sensitivity of the infrared sensor while minimizing false alarms from the sun and other non-threatening sources.

70. A method for manufacturing an electrical insulating shutter system for use on a local operating network comprising:

A. providing at least one shutter or pair of shutters for covering a window or windows or other opening or openings of a building, the shutter or pair of shutters moveably situated over the window or windows or other opening or openings;

B. providing a means deployed on each shutter for opening and closing each shutter or pair of shutters;

C. providing a decision-making logic means deployed on each shutter or pair of shutters, said logic means having the ability to: execute one or more logic tasks; receive information over the local operating network from a plurality of indoor and outdoor remote sensor devices and from other decision-making logic means that are remote; transmit information over the local operating network to other decision-making logic means; wherein the decision-making logic means is not located within the same housing as the plurality of sensors;

D. providing a means for both directly and remotely programming the decision-making logic means;

E. providing a communications transceiver for transmitting and receiving data between the decision-making logic means and the local operating network, at least one transceiver deployed on each shutter;

F. providing a means deployed on each shutter or pair of shutters for powering each decision-making logic means and each transceiver and each means for opening and closing each shutter or pair of shutters; and G. providing the plurality of indoor and outdoor remote sensor devices, each sensor device adapted to measure a physical phenomenon, each sensor device producing an output signal, each sensor device providing input to the decision-making logic means, the sensor devices not all placed together within a single housing, the sensor devices situated both inside of and outside of the building, wherein the logic task or tasks comprise winter application logic for operating in winter, wherein the logic task or tasks comprise summer application logic for operating in summer, wherein when net loss of the electrical insulating shutter system with the shutter or shutters dosed is greater than net loss with the shutter open for the length of a variable specifiable delay period, the winter application logic issues a command to open the shutter or shutters, and when net loss of the electrical insulating shutter system with the shutter or shutters open is greater for the length of a variable specifiable delay period than would be the case if the shutter or shutters were dosed, the winter application logic issues a command to dose the shutter, wherein when outside air temperature exceeds a specified temperature and insolation falling on the electrical insulating shutter system exceeds a specified threshold for a variable specifiable delay period, the summer application logic issues a command to dose the shutter or shutters, and when shutter open net loss minus shutter dosed net loss becomes less than insolation summer threshold for a variable specifiable delay period, the summer application logic issues a command to open the shutter.

71. The method of claim 70, wherein the means deployed on each shutter or pair of shutters for opening and closing each shutter or pair of shutters comprises a direct current electric gear motor that acts on a jack screw fastened via a drive nut or nuts to the shutter or pair of shutters.

72. The method of claim 71, wherein the electric gear motor is remotely controllable through the communications transceiver.

73. The method of claim 70, further comprising the step of providing plurality of shutters or plurality of pairs of shutters or combinations thereof.

74. The method of claim 70, wherein the transceiver further comprises a repeater.

75. The method of claim 70, wherein the transceiver further comprises a circuit for utilizing unique codes.

76. The method of claim 70, wherein the transceiver can select from different channels.

77. The method of claim 70, wherein the means for powering the transceiver is selected from the group consisting of a remote power supply, a battery or batteries, or both.

78. The method of claim 70, wherein the local operating network comprises twisted pair wiring.

79. The method of claim 70, wherein the local operating network comprises radio frequency communications.

80. The method of claim 70, wherein the local operating network comprises infrared communications.

81. The method of claim 70, wherein the local operating network comprises optical communication over optical fiber.

82. The method of claim 70, wherein the local operating network comprises power line carrier communications.

83. The method of claim 70, wherein the local operating network comprises coaxial communications.

84. The method of claim 70, wherein the local operating network utilizes a standard protocol such as LonWorks, CEBus, X10, BACNet and CAN or any other proprietary or non-proprietary protocol.

85. The method of claim 70, wherein the communications transceiver comprises a twisted pair wiring transceiver.

86. The method of claim 70, wherein the communications transceiver comprises a radio frequency transceiver.

87. The method of claim 70, wherein the communications transceiver comprises a power line carrier transceiver.

88. The method of claim 70, wherein the communications transceiver comprises an infrared transceiver.

89. The method of claim 70, wherein the communications transceiver comprises an optical fiber transceiver.

90. The method of claim 70, wherein the communications transceiver comprises a coaxial cable transceiver.

91. The method of claim 70, wherein the sensor device comprises a motion sensor.

92. The method of claim 70, wherein the sensor device comprises an ambient light sensor.

93. The method of claim 70, wherein the sensor device comprises an indoor temperature sensor.

94. The method of claim 70, wherein the sensor device comprises an outdoor temperature sensor.

95. The method of claim 70, wherein the sensor device comprises a visual light sensor.

96. The method of claim 70, wherein the sensor device comprises a pyranometer.

97. The method of claim 70, wherein the sensor device comprises an ultraviolet sensor, the ultraviolet sensor having a zone of sensitivity.

98. The method of claim 70, wherein the sensor device comprises an infrared sensor, the infrared sensor having a zone of sensitivity.

99. The method of claim 97, wherein the ultraviolet sensor further comprises signal processing circuitry that optimizes sensor sensitivity while minimizing false alarms.

100. The method of claim 70, wherein the sensor device comprises an auditory sensor.

101. The method of claim 70, wherein the sensor device comprises a visual sensor.

102. The method of claim 70, wherein the sensor device comprises a carbon monoxide sensor.

103. The method of claim 70, wherein the sensor device comprises a fire sensor.

104. The method of claim 71, wherein the sensor device comprises a smoke sensor.

105. The method of claim 72, wherein the sensor device comprises an alarm system, the alarm system sending alarm signals to the controller through the local operating network.

106. The method of claim 70, wherein the sensor device comprises an occupancy sensor.

107. The method of claim 70, wherein the shutter or pair of shutters is neither a master nor a slave to any other shutter in the system.

108. The method of claim 70, wherein the shutter or pair of shutters is moveably situated over a pet door.

109. The method of claim 70, wherein the shutter or pair of shutters is moveably situated over an air inlet or outlet.

110. The method of claim 70, wherein the shutter or pair of shutters is insulating.

111. The method of claim 70, wherein the shutter or pair of shutters is equipped with fire-proof facades.

112. The method of claim 70, further comprising the step of providing electronics that provide a soft start for the gear motor that opens and closes the shutter using pulse-width modulation.

113. The method of claim 112, wherein the processor monitors the instantaneous current flow to the motor.

114. The method of claim 70, wherein electronics for sensing fires are mounted in the shutter or pair of shutters.

115. The method of claim 70, wherein the decision-making logic means produces an "all closed signal" or an "all open signal" which is transmitted and retransmitted via the transceivers to all shutters or pairs of shutters in the network.

116. The method of claim 70, wherein electronics for sensing and signaling high winds are mounted in an end cap of the upper extrusion of one or more shutters or pairs of shutters on a building.

117. The method of claim 70, further comprising the step of providing a set of light-emitting diodes which signal the status of the mode of operation of the system, need for maintenance, and alarm.

118. The method of claim 117, wherein the set of light-emitting diodes are co-located along with an infrared sensor in a small package just outside at the top of existing windows.

119. The method of claim 70, further comprising the step of providing electronics for sensing and signaling high winds, the electronics mounted together in an housing for outdoor mounting.

120. The method of claim 70, wherein the decision-making logic means is a decision-making logic means selected from the group consisting of a programmable controller, a Complex Programmable Logic Device (CPLD), a Field-Programmable Gate Array (FGPA), and transistors on a PCB.

121. The method of claim 70, wherein the means for powering the decision-making logic means is selected from the group consisting of a remote power supply, a battery or batteries, or both.

122. The method of claim 70, wherein the decision-making logic means can respond to signals directly from an electrical device.

123. The method of claim 70, wherein the means for both directly and remotely programming the decision-making logic means comprises an electrical device selected from the group consisting of infrared transceiver, a radio transceiver, a wired switch, a wired controller, and a computer.

124. The method of claim 70, wherein the logic task or tasks are stored in a memory means for storing information.

125. The method of claim 124, wherein the memory means comprises random access memory.

126. The method of claim 70, wherein the logic task or tasks comprise opening and closing application logic for opening and closing each shutter.

127. The method of claim 70, wherein the logic task or tasks comprise ambient light level application logic for maintaining a particular light level within an area.

128. The method of claim 70, wherein the logic task or tasks comprise reset application logic for placing the device in an initialization state.

129. The method of claim 70, wherein the logic task or tasks comprise go unconfigured application logic for placing the device in an unconfigured state.

130. The method of claim 70, wherein the logic task or tasks comprise communication input/output application logic for receiving data from and/or transmitting data to the local operating network.

131. The method of claim 70, wherein the logic task or tasks comprise inhibit application logic for inhibiting and overriding the normal operating mode of the device.

132. The method of claim 70, wherein the logic task or tasks comprise indoor air temperature application logic for measuring and processing the indoor temperature of the indoor area surrounding an electrical air temperature measuring sensor.

133. The method of claim 70, wherein the logic task or tasks comprise outdoor air temperature application logic for measuring and processing the outdoor temperature of the outdoor area surrounding an electrical air temperature measuring sensor.

134. The method of claim 70, wherein the logic task or tasks comprise temperature and insolation application logic for providing open, close, and partially opening operating signals to the shutters.

135. The method of claim 70, wherein the logic task or tasks comprise fast change application logic for detecting rapid increases in sensor data and in response thereto sending a warning message over the local operating network.

136. The method of claim 70, wherein the logic application task or tasks comprise alarm response application logic for detecting alarm signals and in response thereto sending a warning message over the local operating network to open or close the shutter.

137. The method of claim 70, wherein the logic application task or tasks comprise ultraviolet sensor application logic for optimizing sensitivity to flames in the zone of sensitivity of the ultraviolet sensor while minimizing false alarms from the sun and other non-threatening sources.

138. The method of claim 70, wherein the logic application task or tasks comprise infrared sensor application logic for optimizing sensitivity to flames in the zone of sensitivity of the infrared sensor while minimizing false alarms from the sun and other non-threatening sources.

* * * * *